United States Patent [19]

Vandling

[11] 4,079,425
[45] Mar. 14, 1978

[54] FACSIMILE TRANSMISSION MODE SIGNALING

[75] Inventor: John M. Vandling, Pleasantville, N.Y.

[73] Assignee: Exxon Research & Engineering Co., Linden, N.J.

[21] Appl. No.: 617,104

[22] Filed: Sep. 26, 1975

[51] Int. Cl.² .................................................. H04N 1/36
[52] U.S. Cl. ...................................... 358/265; 358/275
[58] Field of Search ................... 178/69.5 R, 6.6 R, 6, 178/7.1, 7.6, DIG. 3; 358/264, 265, 267, 275

[56] References Cited

U.S. PATENT DOCUMENTS

| | | | |
|---|---|---|---|
| 3,313,884 | 4/1967 | Hackenberg et al. | 178/69.5 F |
| 3,436,474 | 4/1969 | Saeger et al. | 178/6 |
| 3,448,207 | 6/1969 | Green et al. | 178/6 |
| 3,646,256 | 2/1972 | Jacob et al. | 178/DIG. 3 |
| 3,761,610 | 9/1973 | Krallinger et al. | 178/6 |
| 3,819,854 | 6/1974 | Kolb | 178/6.7 R |
| 3,889,057 | 6/1975 | Perreault | 178/69.5 F |
| 3,919,464 | 11/1975 | Kondoh | 178/6 |

*Primary Examiner*—John C. Martin
*Attorney, Agent, or Firm*—Norman L. Norris

[57] ABSTRACT

A facsimile transmitter comprises a rotatable drum and a detector for detecting dark-light variations in a document mounted on the drum. A frequency modulator is coupled to the detector for generating frequency modulated transmission signals representing dark-light variations in the document. A sync generator, which generates synchronizing pulses coincident with juxtaposition between the detector and the document-holding clamp on the drum, is also coupled to the frequency modulator. The transmission mode, e.g. the choice of utilizing an internal stable frequency or external power line frequency synchronizing signal to synchronize the drive of the drum, is signaled by varying the length of the synchronizing pulse during the sync period preceding transmission of document information.

30 Claims, 3 Drawing Figures

FACSIMILE TRANSMISSION MODE SIGNALING

BACKGROUND OF THE INVENTION

This invention relates to facsimile systems comprising a transmitter, a receiver and a communications network therebetween. More particularly, this invention relates to a system wherein a document is scanned in a facsimile transmitter to generate electrical information-bearing signals representing the dark-light variations in the document being scanned. These information-bearing signals are then transmitted over the communications network to a facsimile receiver where the information-bearing signals are converted to marks or images on a copy medium so as to form a copy which is a reasonable facsimile of the original document.

Presently available facsimile transmitters and receivers are capable of different transmission modes. For example, the facsimile transmitters and receivers are capable of operating at different scanning rates depending upon the particular resolution required in a transmission so as to achieve different transmission times or durations. The QWIP 1000 facsimile transceiver manufactured by QWIP Systems Division of Exxon Enterprises is capable of such different scanning rates to achieve a 4-minute transmission mode as well as a 6-minute transmission mode.

Typically, the operator of a facsimile transmitter such as the QWIP 1000 is able to advise the operator of a facsimile receiver of the particular choice of a transmission mode. In other words, the facsimile transmitter operator can examine the document to be transmitted and determine the resolution required while also considering the increased cost involved in a long distance telephone transmission of 6 minutes versus 4 minutes. It is however desirable in some instances to provide for automatic signaling of the particular transmission mode so as to permit the receiver to automatically respond to and prepare for the transmission without intervention by an operator.

In order to provide for transmission mode signaling, the Model 410 transceiver manufactured by the Xerox Corporation frequency modulates the synchronizing pulse which is coincident with the juxtaposition between the photodetector and the clamp of a rotating drum on the transceiver. More particularly, a signal is transmitted from a transmitter having a frequency of 1500 Hz. during the synchronizing pulse for 6-minute transmission mode and a signal of 1250 Hz. is generated during the synchronizing pulse representing a 4-minute transmission mode. Since the Xerox 410 provides for a 15 second synchronizing period at the beginning of a transmission, it is possible for a receiver to detect the frequency of the synchronizing pulse and select the appropriate scanning rate before the document transmission begins. Typically, the duration of the synchronizing pulse is constant and the occurrence of the pulse relative to the rotation of the facsimile drum clamp past the detector is a function of the tolerance on a switch associated with the rotatable drum.

In addition to providing different scanning rate transmission modes, e.g. 4 or 6 minute transmission modes, it is desirable to provide for the selection of other transmission modes. For example, it is desirable to provide for the selection of different signals for synchronizing a facsimile transmitter and receiver. More particularly, it is possible to synchronize a facsimile transmitter and receiver on synchronizing signals which are internally generated by a crystal oscillator as shown in application Ser. No. 493,119 filed July 30, 1974. It is also possible to synchronize a facsimile transmitter and receiver on an externally generated signal such as the power line frequency. Heretofore, voice communication between the operator of the facsimile receiver and the operator of the facsimile transmitter has been utilized to assure that both the transmitter and the receiver were synchronized to the same synchronizing signal.

SUMMARY OF THE INVENTION

It is an object of this invention to provide new and improved facsimile transmission mode signaling.

It is a more specific object of this invention to provide facsimile transmission mode signaling which indicates the selection of a particular synchronizing signal.

It is a further specific object of this invention to provide facsimile transmission mode signaling which is compatible with existing and commercially accepted facsimile transmission mode signaling.

In accordance with these and other objects of the invention, a preferred embodiment of the invention comprises a facsimile unit for transmitting signals representing dark-light variations in a document to a remote location. The facsimile unit includes detector means for detecting dark-light variations in a document and scanning means for moving the detector means relative to the document. First drive means drive the scanning means at a rate directly proportional to and synchronized with the frequency of a first signal and second means drive the scanning means at a rate directly proportional to and synchronized with the frequency of a second signal. Mode signaling means generate a signal representing the selected transmission mode, and modulator means are coupled to the detector means as well as the mode signaling means for generating modulated transmission signals representing dark-light variations in the document and the selected transmission mode.

In the preferred embodiment, the modulator means comprises means for generating frequency modulated signals representing dark-light variations in the document such that the modulator means generates signals of a first frequency representing a dark or black area on a document and signals of a second frequency representing the light or white area on a document. The modulator means is responsive to the mode signaling means for generating signals of the first frequency for a first predetermined duration followed by a second frequency of a second predetermined duration so as to represent the selected transmission mode. Generation of the first and second frequencies for the first and second predetermined durations may be repeated during a mode signaling period which is determined by timer means. The first duration of the first frequency may be increased relative to the second duration so as to indicate one mode selection and said first duration may be decreased relative to said second duration to indicate another mode selection.

In the preferred embodiment, the scanning means comprises a rotatably mounted drum which is juxtaposed to the detector means such that the first and second durations correspond to predetermined angular rotations of the drum. The drum comprises clamping means for holding the document in place. The generation of the second frequency for the second predetermined duration substantially coincides in time with juxtaposition between the clamp and the detector where the second frequency corresponds to a light or white region on a document such that any gray or black shadows detected near the clamp means are effectively blanked out.

The facsimile unit representing the preferred embodiment of the invention may be utilized in combination with a facsimile receiver unit including demodulator means for demodulating transmitted signals representing dark-light variations in the remotely located document and transducer means juxtaposed to a copy medium for marking on the copy medium in response to demodulated signals representing the dark-light variations in the remotely located document. Scanning means move the copy medium relative to the transducer means. In accordance with this invention, mode signal detection means and mode selection means are coupled to the demodulator means for automatically selecting the proper transmission mode.

DETAILED DESCRIPTION OF A PREFERRED EMBODIMENT

Figure 1:
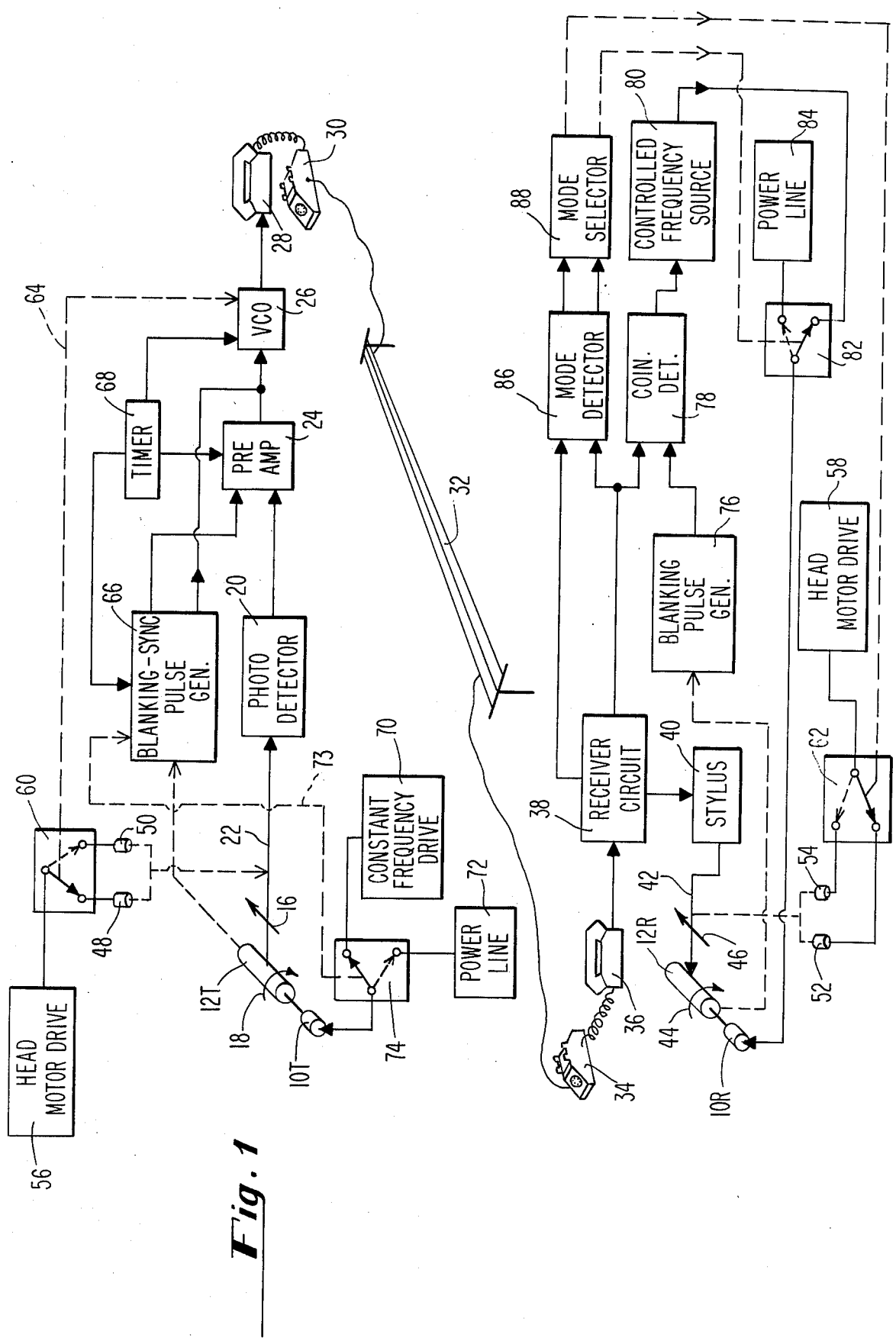
FIG. 1 is a block diagram of a facsimile system representing the preferred embodiment of the invention.

Referring now to the facsimile system shown in FIG. 1, a facsimile transmitter comprises a drum 12T rotated by a motor 10T so as to create a relative scanning movement between a document carried by the drum 12T and the scanning head not shown. As the scanning head is advanced axially along the drum 12T as indicated by an arrow 16 and the drum 12T rotates about its axis as indicated by an arrow 18, successive paths on the document are illuminated and variations in light intensity due to the reflectivity of the document are scanned by a photodetector 20 via a path of optical communication as depicted by a line 22.

The photodetector 20 then converts the variations in light intensity which are a function of the reflectivity of the scanned document into electrical signals. The electrical signals are amplified at a preamplifier 24 and utilized to control a VCO (voltage controlled oscillator) 26 to generate frequency modulated signals representing the information content of the document carried by the drum 12T. The frequency modulated signals are then applied to an acoustical coupler 28 associated with a conventional telephone handset 30.

The frequency modulated signals are then transmitted by suitable means such as conventional telephone lines 32 to a facsimile receiver which is coupled to another conventional telephone handset 34 and an associated acoustical coupler 36.

The output from the acoustical coupler 36 is applied to receiver circuitry 38 including frequency demodulator circuitry for generating transducer control signals which are applied to a suitable transducer such as a stylus 40 which is in marking communication as depicted by a line 42 with a copy medium carried by a rotatable receiver drum 12R. As the drum 12R is rotated by a receiver drum motor 10R about the drum axis as depicted by an arrow 44, the position of marking communication depicted by the line 42 is advanced axially along the drum as depicted by arrow 46 and successive paths on the copy medium are juxtaposed to the stylus 40 as as to mark the copy medium in accordance with received signals representing corresponding dark-light variations of the document.

In accordance with prior commercial practice, both the facsimile transmitter and the facsimile receiver shown in FIG. 1 may be operated in a 4- or 6-minute transmission mode. This is accomplished by utilizing a pair of head motors 48 and 50 in the transmitter and a pair of head motors 52 and 54 in the receiver. By selectively connecting the head motors 48 and 50 and the head motors 52 and 54 to a head motor drive 56 in the transmitter and the head motor drive 58 in the receiver through switches 60 and 62 respectively, a path of optical communication depicted by the line 22 and the area of marking communication depicted by the line 42 may move at different rates along the axial paths depicted by the arrows 16 and 46 respectively. In the preferred embodiment, the different scanning rates along the paths depicted by the arrows 16 and 46 are achieved by utilizing one speed reduction ratio for the motors 48 and 52 and another speed reduction ratio for the motors 50 and 54.

As shown in FIG. 1, the transmitter comprises a blanking-synchronizing pulse generator 66 which is mechanically coupled to the drum 12T so as to generate a blanking pulse which is applied to the VCO 26 as the document clamp (not shown) on the drum 12T is juxtaposed to the photodetector 20. By providing a blanking pulse from the generator 66 at this particular time, any gray or black shadows associated with the document clamp which would be detected by the photodetector 20 and transmitted as black will be masked.

In accordance with accepted commercial practice, the frequency of the signal generated at the output of the VCO 26 is controlled during an initial synchronizing period determined by a timer 68 in the following manner. As portions of the drum 12T other than the clamp are juxtaposed to the photodetector 20, an output from the timer 68 is applied to the VCO 26 so as to generate the first signal generally indicative of a dark or black region on a document for a first duration. Typically, this first frequency is 2400 Hz. When the clamp on the drum 12T becomes juxtaposed to the photodetector 20, a synchronizing pulse from the output of the blanking-synchronizing pulse generator 66 is applied to the input of the VCO 26 so as to force the VCO 26 to generate a second frequency, typically 1500 Hz., of a second duration generally corresponding to a white region on the document for the period representing passage of the clamp past the photodetector 20.

In order to indicate the scanning rate of the head along the axial scanning path depicted by the arrow 16, a mechanical linkage 64 extends from the switch 60 to the VCO to establish a second frequency corresponding to the white or light region. Typically, positioning of the switch 60 in the position shown in full will adjust the VCO 26 so as to generate a sync pulse frequency of 1500 Hz. indicating the 6-minute scanning mode. When the switch 60 is moved to the position shown in phantom, the mechanical linkage 64 adjusts the VCO 26 so as to produce a sync pulse frequency of 1250 Hz. indicating the 4-minute scanning mode. At the end of the synchronizing period, a timer 68 readjusts the VCO 26 so as to reestablish the usual 1500 Hz. for white blanking.

In accordance with this invention, additional transmission mode signaling is provided to indicate the selection of an internally generated synchronizing signal and an externally generated synchronizing signal. As shown in FIG. 1, the internally generated synchronizing signal is provided by a constant frequency drive 70 which may comprise a crystal controlled oscillator and associated drive circuitry as shown in copending application Ser. No. 493,119 filed July 30, 1974 which is incorporated herein by reference. The externally generated synchronizing signal may be provided by a power line 72 such that a switch 74 can selectively connect the constant frequency drive 70 or the power line 72 to the motor 10T.

In further accordance with this invention, the transmission mode represented by the selection of an internally or externally generated synchronizing signal is signaled by controlling the length of the synchronizing pulses from the pulse generator 66 which are applied to the VCO 26 during the synchronizing period as determined by the timer 68. In this connection, a mechanical linkage 73 from the switch 74 to the pulse generator 66 is provided. The synchronizing pulse width or duration as determined by the setting of the switch 74 is returned to the blanking pulse width at the end of the synchronizing period by an output from the timer 68 which is applied to the pulse generator 66. In the preferred embodiment of the invention, a synchronizing pulse of 25 milliseconds is utilized to indicate an externally generated power line synchronizing signal and a synchronizing pulse of 15 milliseconds is utilized to indicate an internally generated synchronizing signal from the constant frequency drive 70. The normal blanking pulse after the end of the synchronizing period may have a 10 to 20 millisecond duration as required to eliminate shadows near the document paper clamp.

The receiver of the facsimile system shown in FIG. 1 comprises a synchronizing pulse generator 76 which is coupled to the drum 12R for generating synchronizing pulses at the receiver corresponding to juxtaposition between the clamp of the drum 12R and the area of marking communication 42 for the stylus 40. The synchronizing pulses from the generator 76 are applied to a coincidence detector 78 which is also coupled to the output of the receiver circuit 38 for detecting coincidence of the generated synchronizing and received synchronizing pulses during the synchronization period. The output from the coincidence detector 78 is then applied to a controlled frequency source 80 which adjusts the drive frequency which is generated by the controlled frequency source and applied to the drum motor 10R through a switch 82 until synchronization between the drum 12T of the transmitter and the drum 12R of the receiver is achieved. The details concerning the coincidence detector 78 and the controlled frequency source 80 are disclosed in the aforesaid application Ser. No. 493,119 which is incorporated herein by reference.

When the switch 82 is in the position shown in full, the controlled frequency source 80 is connected to the drum motor 10R, and the drum 12R is synchronized utilizing an internally generated signal. It is also possible to move the switch 82 to the position shown in phantom so as to drive the motor 10R from a power line 84 thus utilizing an externally generated sychronizing signal.

In order to assure that the transmitter and the receiver drum speeds are synchronized on the same signal, i.e., an internally generated synchronizing signal or an externally generated synchronizing signal, the receiver is provided with a mode detector circuit 86 which is coupled to the output of the receiver circuit 38.

The mode detector 86 which is responsive to the frequency of the signals representing the transmitter blanking pulses is coupled to a mode selector 88 which appropriately positions the switch 62 so as to selectively connect the motor 52 or the motor 54 to the head carrying the stylus 40 depending upon the transmission mode, i.e. 4 or 6 minutes, which has been selected at the transmitter as indicated by the frequency of the blanking pulses.

In accordance with this invention, the mode detector 86 also comprises means for detecting the duration of the received synchronizing pulses applied to the coincidence detector 78 which are indicative of the synchronizing signal which has been selected at the transmitter. The mode selector 88 is also responsive to the output from the mode detector 86 so as to connect the switch 82 to the appropriate drive for the motor 10R depending upon the selected synchronizing signal at the transmitter. More particularly, the switch 82 is connected to the controlled frequency source 80 when the switch 74 is connected to the constant frequency drive so that both the transmitter and the receiver are operating on the crystal controlled internally generated synchronizing signal. On the other hand, the switch 82 can connect the power line 84 to the motor 10R and the switch 74 can connect the power line 72 to the motor 10T so that both the transmitter and the receiver are synchronized on externally generated signals.

Figure 2:
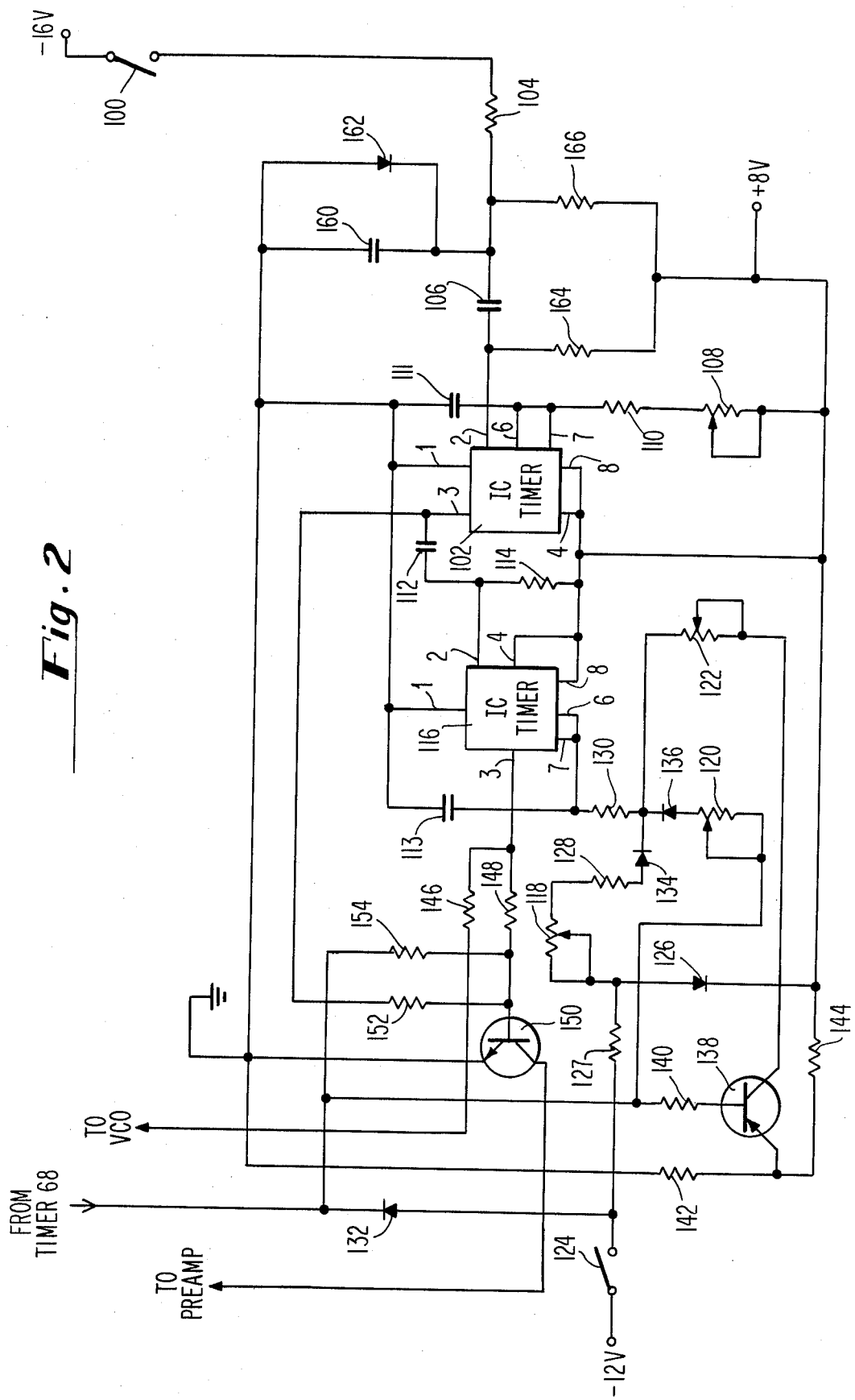
FIG. 2 is a schematic diagram of a blanking-synchronizing pulse generator shown in block form in FIG. 1.

Reference will now be made to FIG. 2 for a detailed description of the blanking pulse generator 66 which is capable of generating blanking pulses of different durations so as to indicate the selected transmission mode. The generator 66 comprises a drum switch 100 which is connected to a −16 volt source so as to generate a negative going pulse when the drum switch 100 is closed. The negative going pulse which corresponds with juxtaposition between the clamp of the drum 12T and a photodetector 20 is then applied to a timer 102 at its pin 102-2 through a resistor 104 and a capacitor 106. The chip 102 may comprise an NE555 integrated circuit manufactured by Signetics Corporation.

The function of the timer 102 is to assure that the blanking pulse is appropriately located in time, i.e., the blanking pulse is coincident with juxtaposition between the clamp of the drum 12T and the photodetector 20. In actual practice, the timer 102 should time out as the edge of the clamp on the drum 12T becomes juxtaposed to the photodetector 20. This may be accomplished electrically, regardless of the position of the drum switch 100, by appropriately adjusting a potentiometer 108 which is in series with a resistor 110 and a capacitor 111 between ground and the +8 volt power supply.

At the end of the time-out period for the timer 102, the pin 102-3 of the timer 102 goes low. The low going output at the pin 102-3 is differentiated by a capacitor 112 and a resistor 114 and applied to a second IC timer 116 at a pin 116-2. Again, the timer 116 may comprise an NE555 integrated circuit manufactured by Signetics Corporation. The time 116 is utilized to establish the duration of the blanking or synchronizing pulses and thereby indicate or signal the particular transmission mode selected at the transmitter.

In order to adjust the duration of the blanking pulses in accordance with this invention, potentiometers 118, 120 and 122 are provided.

As will now be described in detail, potentiometers 118 and 120 come into play to establish the duration of the synchronizing pulse as 15 milliseconds when the switch 74 of FIG. 1 is in the position shown in full so as to connect the constant frequency drive 70 to the motor 10T as shown in FIG. 1. When the switch 74 of FIG. 1 is in the position shown in full, a relay contact 124 is closed so as to connect a +12 volt power supply through a resistor 127 to a potentiometer 118 and the anode of a diode 126 having its cathode connected to a +8 volt power supply. With the contact 124 closed, the diode 126 clamps the terminal of the potentiometer 118 to the +8 volt power supply. As a result, the potentiometer 118 is activated and connected to a series resistor 128, a diode 134 and a resistor 130 which is connected to pins 116-6 and 116-7.

The potentiometers 118 and 120 will remain in control of the synchronizing pulse duration as determined by the timer 116 as long as the switch 124 remains closed and the output from the timer 68 of FIG. 1 remains high. When the output from the timer 68 of FIG. 1 goes low, a diode 132 conducts to clamp the voltage at the terminal of the potentiometer 118 to ground thereby removing the potentiometer 118 from control of the timer 116.

When the switch 124 is open and the output from the timer is high, the potentiometer 120 is connected to the resistor 130 through a conducting diode 136 in series therewith to establish a 25 millisecond blanking pulse as determined by the period of the timer 116. When the output from the timer 68 of FIG. 1 goes low, the diode 136 becomes nonconductive and the standard blanking pulse under the control of the potentiometer 122 comes into play as will now be described.

During the synchronizing timing period established by the timer 68, the high output from the timer 68 is applied to the base of a transistor 138 through a resistor 140. The high at the base of the transistor 138 having its emitter connected to ground through a resistor 142 and its collector connected to potentiometer 122 renders the transistor 138 non-conductive. As a result, the potentiometer 122 is not in the timing circuit of the timer 116. When the output from the timer 68 goes low at the end of the synchronizing period, the transistor 138 becomes conductive and connects the potentiometer 122 to the +8 volt power supply through a resistor 144. The potentiometer 122 may be adjusted such that the series resistance of the potentiometer 122 and the resistor 144 establishes a suitable blanking period, e.g., 10-20 milliseconds.

The blanking pulses generated at pin 116-3 of the timer 116 are applied to the VCO 26 through a resistor 146. In addition, the blanking pulses at the pin 116-3 are applied to the base of a transistor 150 though a resistor 148. The collector of the transistor 150 is connected to the AGC circuitry of the preamplifier 24 so that a low going pulse at the pin 116-3 will inhibit the AGC action of the preamplifier 24 during the blanking period thereby assuring that the AGC circuit is not responsive to the white video seen during the blanking period.

The base of the transistor 150 is also connected to pin 102-3 of the timer 102 through a resistor 152 so as to inhibit the AGC when the switch 100 is first closed. In addition, the timer 68 is connected to the base of the transistor 150 through a resistor 154 so as to inhibit the AGC throughout the synchronizing period.

Other circuit elements in the blanking-synchronizing pulse generator shown in FIG. 2 include a capacitor 160 which is combined with the resistor 104 to form a spike suppression network. A clamping diode 162 is connected in parallel with the capacitor 160. A resistor 164 acts as a pull-up resistor to maintain a +8 volt potential at the pin 102-2 and a resistor 116 serves to discharge the capacitor 106 between trigger times for the timer 102.

Figure 3:
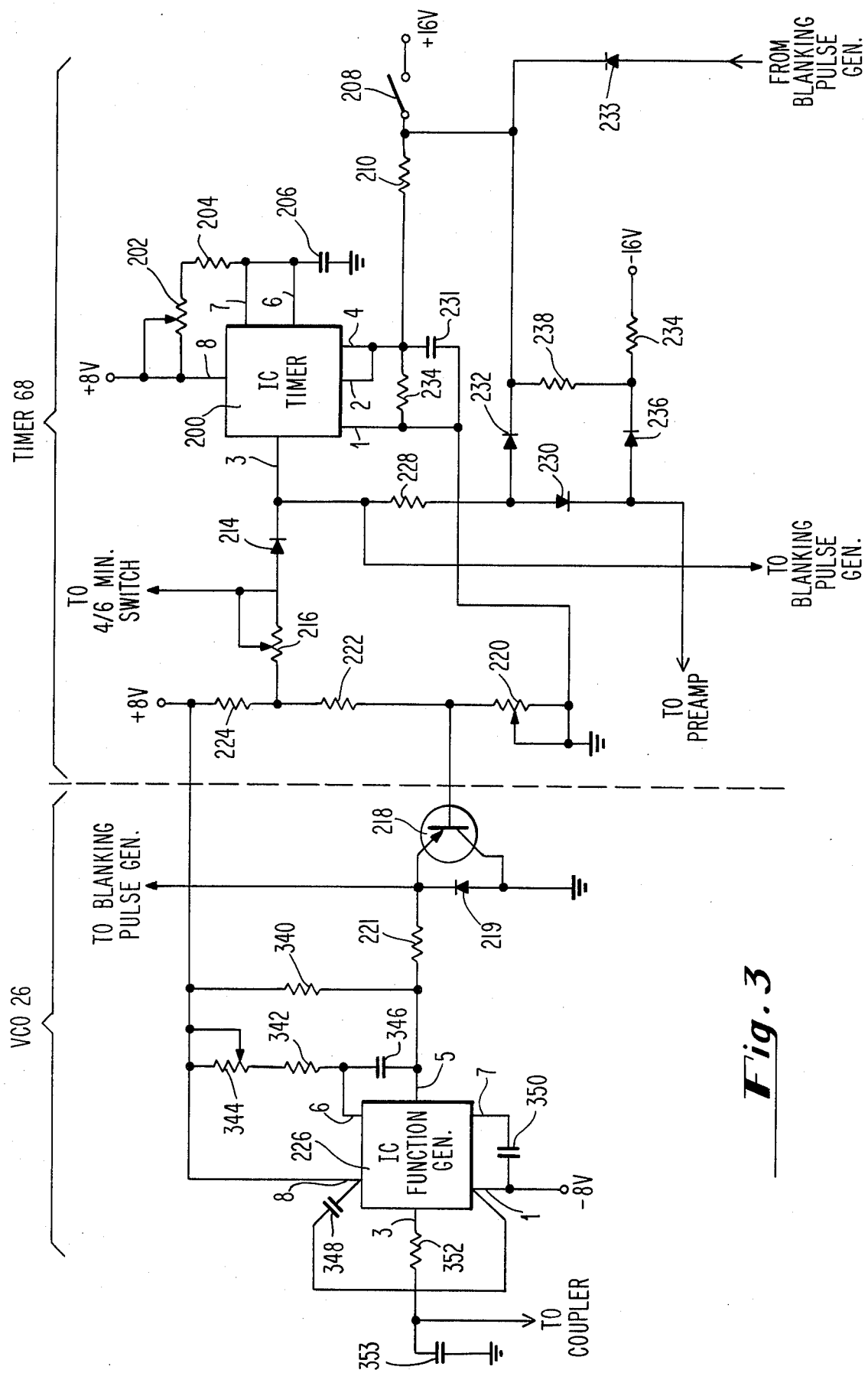
FIG. 3 is a schematic diagram of the timer and the VCO (voltage controlled oscillator) shown in block form in FIG. 1.

The timer 68 and the VCO 26 will now be described in detail with reference to FIG. 3. As shown in FIG. 3, the timer 68 comprises a timer 200 which may comprise a NE555 integrated circuit manufactured by Signetics Corporation. RC timing circuitry including a potentiometer 202, a resistor 204 and a capacitor 206 are associated with the timer 200.

In order to initiate timing by the timer 200, it is necessary to assure the application of a positive voltage at pin 200-4 of the timer 200. In this connection, a switch 208 connects a +16 volt supply to pin 200-4 through a resistor 210 when the drum 12T first begins to rotate. Before the switch 208 is closed, timer pin 200-4 is held low by resistor 234 which also causes the timer 200 to be triggered and ready to time out when the pin 200-4 goes high.

When the output of the pin 200-3 goes high during the synchronizing period, a diode 214 is back biased so as to disconnect a potentiometer 216 from the base circuit of a transistor 218 along with another potentiometer 220 and series resistors 222 and 224. A 4/6 minute transmission mode selection switch is connected to the potentiometer 216 so as to permit the resistance in the base circuit of the transistor 218 to be adjusted such that the VCO 26 generates a frequency during the synchronizing pulse period which is indicative of the particular 4 or 6 minute transmission mode. At the end of the synchronizing period which may be 15 seconds long, the output from the pin 3 goes low so as to connect the potentiometer 216 in the base circuit of the transistor 218. With the potentiometer appropriately set for the 4 or 6 minute mode, a sychronizing pulse from the pulse generator 66 applied to the emitter of the transistor 218 which is connected to ground through a diode 219 will produce the appropriate control signal applied through a resistor 221 to a function generator chip 226 so as to generate a synchronizing pulse signal of 1500 Hz. when the switch associated with the potentiometer 216 is in the 6-minute mode and 1250 Hz. when the switch 216 is set for the 4-minute mode.

The high output on pin 200-3 of the timer 20 is also applied to a resistor 228 in series with a diode 230 for generating control signals for the preamplifier 224 such that the output of the VCO which is controlled by the preamplifier 24 represents a black signal, i.e., 2400 Hz., during the 15-second synchronizing period established by the timer 68 of FIG. 1. In this connection, the diode 230 will become conductive when the pin 200-3 of the timer 200 goes high during the synchronizing period. However, the diode 230 can only become conductive when the switch 208 is closed so as to reverse bias a diode 232 connected to the junction of the resistor 228 and the diode 230 to a nonconductive state. If the switch 208 is open as shown in FIG. 3, the diode 230 will remain nonconductive and a negative voltage will be applied to the preamplifier through a resistor 234 and a diode 236. However, once the switch 208 is closed, a positive voltage is applied to the cathode of the diode 236 through a resistor 238 thereby permitting the positive voltage at the pin 200-3 to be applied to the preamplifier.

As also shown in FIG. 3, the output at the timer pin 200-3 is applied to the blanking pulse generator to insure that the correct mode identifying signal, i.e., 15 or 25 milliseconds, is generated during the synchronizing period. As described with reference to FIG. 2, this output is utilized to connect and disconnect the blanking pulse period potentiometers 118, 120 and 122. A capacitor 231 and a resistor 234 connect pins 200-2 and 200-4 to ground.

In addition to the transistor 218 and the function generator 226, the VCO 26 of FIG. 1 which may comprise a NE566 integrated circuit manufactured by Signetics Corporation includes an RC network comprising a resistor 340, a resistor 342, a potentiometer 344 and a capacitor 346, all of which are connected between pins 226-5, 226-6 and 226-8 of the function generator 226. Additional capacitors 348 and 350 are connected between pin 226-1 and pins 226-7 and 226-8. The output from the function generator is then applied to the coupler 28 shown in FIG. 1 through a resistor 352 and an integrating capacitor 353.

As shown and described in the foregoing, outputs from the blanking pulse generator 66 and the timer 68 are applied to the preamplifier during the synchronizing period so as to generate transmission signals corresponding to a black 2400 Hz. frequency which is interrupted at a blanking pulse time by a white 1500 or 1250 Hz. frequency. In this connection, the preamplifier 24 may comprise the preamplifier disclosed in copending application Ser. No. 606,507 filed Aug. 21, 1975. When using a preamplifier of the type disclosed in said application, the output from the timer 68 is applied to the inverting input of the second operational amplifier 116 which is incorporated herein by reference so as to produce an operational amplifier output corresponding to a black level for application to the VCO 26. An output from the blanking pulse generator 66 is applied to the preamplifier when the switch 100 closes thereafter during the blanking period to inhibit the AGC. When utilizing the preamplifier circuit of the aforesaid copending application Ser. No. 606,507, the output from the blanking pulse generator 66 is applied to the base of the transistor 124 to the feedback path of the AGC so as to inhibit the AGC during the blanking period. The AGC inhibiting signal is the same signal which is applied through a diode 233 to the cathode of the diode 232 which in turn interrrupts the application of a black enabling signal applied to the inverting terminal of the second operational amplifier in the aforesaid preamplifier circuit.

In the foregoing, the signaling of particular transmission modes by particular means have been shown and described. It will of course be understood that other transmission modes may be signaled utilizing the same means or other means may be utilized to signal the transmission modes previously described. For example, the invention contemplates the use of additional resistive networks which may be selectively incorporated into the circuitry associated with the timer 116 so as to permit the adjustment of the synchronizing pulse width to indicate other modes of operation such as a transmission time compression mode wherein higher horizontal and/or vertical scan speeds may be employed, e.g., the system disclosed in copending application Ser. No. 449,514 filed Mar. 8, 1974, now U.S. Pat. No. 3,950,563.

It will also be understood that the particular synchronizing pulse period chosen is not necessarily critical. For example, it would be possible to utilize a 25 millisecond blanking period to indicate the use of an internally generated synchronizing signal and a 15 millisecond signal to indicate the use of an externally generated synchronizing signal. Similarly, other blanking pulse durations, e.g., 18 milliseconds may be utilized. It will further be understood that the choice of a 2400 Hz. frequency to indicate a black region and a 1500 Hz. frequency to indicate a white region is merely illustrative of frequencies which may be utilized in practicing the invention.

It will be further understood that the signaling of the particular synchronizing signal utilized during a transmission, i.e., internal or external, may also be accomplished by means other than the adjustment or selection of the blanking pulse period. For example, the 2400 Hz. signal during the synchronizing period may be FM modulated within narrow limits of 2400 Hz. to provide a number of mode identification or signaling channels both during the initial synchronizing period and during the transmission of the document. In addition, the 1500 Hz. frequency could be used in a similar way either in conjunction with 2400 Hz. signaling or separately.

Although details of the mode detector 86 and the mode selector 88 have not been shown or described, it will be understood that the circuitry embodied in the mode detector 86 and the mode selector 88 could be constructed by one of ordinary skill in the art. Moreover, mode detection and mode selection may be performed by an operator at the receiver.

It will therefore be understood that although a specific embodiment of the invention has been shown and described and various modifications have been suggested, other embodiments and modifications will occur to those of ordinary skill in the art and such embodiments and modifications will fall within the true spirit and scope of the invention as set forth in the appended claims.

What is claimed is:

1. A facsimile unit for transmitting signals representing dark-light variations in a document to a remote location comprising:
   detector means for detecting dark-light variations in a document;
   scanning means for moving said detector means relative to the document;
   first means for driving said scanning means at a rate directly proportional to and synchronized with the frequency of an internally generated signal in one transmission mode;
   second means for driving said scanning means at a rare directly proportional to and synchronized with the frequency of an externally generated signal in another transmission mode;
   mode signaling means for generating a signal representing the selection of said one or said other transmission mode; and
   modulator means coupled to said detector means and said mode signaling means for generating modulated transmission signals representing dark-light variations in the document and the selected transmission mode.

2. The facsimile unit of claim 1 wherein said modulator means comprises means for generating frequency modulated signals representing dark-light variations in the document and the selected transmission mode, said modulator means generating signals of a first frequency representing a dark area on a document and signals of a second frequency representing a light area on a document.

3. The facsimile unit of claim 2 wherein said modulator means is responsive to said mode signaling means to repeatedly generate signals of a first frequency for a first duration followed by a second frequency of a second selected duration so as to represent the selected transmission mode prior to transmission of signals representing dark-light variations in the document.

4. The facsimile unit of claim 3 wherein said modulator means in response to said mode signaling means generates said signals of said first and second frequencies for said first and second predetermined durations repeatedly during a mode signaling period.

5. The facsimile unit of claim 4 comprising timer means for limiting the generation of said signals representing the selected mode to a predetermined period of time at the outset of a facsimile transmission period.

6. The facsimile unit of claim 4 wherein said mode signaling means comprises means for controlling said first duration with respect to said second duration at a substantially constant scanning rate, said first duration being increased relative to said second duration to indicate one mode selection and decreased relative to said second duration to indicate another mode selection.

7. The facsimile unit of claim 6 wherein said scanning means comprises a rotatably mounted drum, said detector means being juxtaposed to said rotatably mounted drum, said first and said second durations corresponding to predetermined angular positions of said drum.

8. The facsimile unit of claim 7 wherein said drum comprises clamp means for holding said document in place, said second frequency corresponds to a light region on a document and said second duration substantially coincides to juxtaposition between said detector means and said clamp means.

9. The facsimile unit of claim 8 wherein the generation of said first frequency for said first duration corresponding to the absence of juxtaposition between said detector means and said clamp means is discontinued after a predetermined mode signaling period.

10. The facsimile unit of claim 9 wherein the generation of said second frequency for a duration substantially coinciding with juxtaposition between said detector means and said clamp means continues after said mode signaling period so as to effectively blank out any shadows at said clamp means.

11. The facsimile unit of claim 1 in combination with another facsimile unit for receiving signals representing dark-light variations in a document, said other facsimile unit comprising:
  demodulator means for demodulating transmitted signals representing dark-light variations in a remotely located document;
  transducer means juxtaposed to a copy medium for marking on the copy medium in response to demodulated signals representing dark-light variations in the remotely located document;
  scanning means for moving said transducer means relative to the copy medium; and
  mode signal detection means coupled to said demodulator means for automatically selecting the proper transmission mode.

12. The facsimile unit of claim 11 wherein said modulator means comprises means for generating frequency modulated signals representing dark-light variations in the document, said modulator means being responsive to said mode signaling means for generating signals of a first frequency representing a dark area on a document for a first predetermined duration between synchronizing signals followed by signals of a second frequency representing a light area on a document for a second predetermined duration during synchronizing signals.

13. The facsimile unit of claim 12 wherein said modulator means is repeatedly responsive to said mode signaling means so as to repeatedly generate said signals of said first and second frequencies of said first and second predetermined durations.

14. The facsimile unit of claim 13 wherein said scanning means comprises a rotatably mounted drum, said detector means being juxtaposed to said rotatably mounted drum, said first and second durations corresponding to predetermined angular rotations of said drum.

15. The facsimile unit of claim 14 wherein said drum comprises clamp means for holding said document in place, said second frequency corresponding to a light region on a document and said second duration corresponding to juxtaposition of said detector means with said clamp on said drum.

16. The facsimile unit of claim 15 further comprising timing means for terminating the generation of said second frequency for said second duration after a predetermined synchronizing period.

17. The facsimile unit of claim 1 wherein said mode signaling means comprises means for generating periodic signals of selected duration prior to transmission of video information representing dark-light variations during a synchronizing period, said periodic signals representing the predetermined relative position of said scanning means relative to said detector means, the time elapsed between said periodic signals being large relative to the duration of said periodic signals.

18. The facsimile unit of claim 17 wherein said scanning means comprises a rotatably mounted drum and said detector means is juxtaposed to said rotatably mounted drum, said periodic signals corresponding to predetermined angular positions of said drum.

19. The facsimile unit of claim 18 wherein said drum comprises clamp means for holding said document in place, said periodic signal being coupled to said modulator means so as to generate a modulated transmission signal resembling a transmission signal representing a light area.

20. The facsimile unit of claim 17 wherein said modulator means comprises means for generating frequency modulated signals representing dark-light variations in the document, said modulator means being responsive to said mode signaling means and said sync generator means for generating said first modulated synchronizing transmission signals characterized by a first frequency representing a dark area on a document for a first predetermined duration between synchronizing signals followed by said second modulated synchronizing transmission signals characterized by a second frequency representing a light area on a document for a second predetermined duration during synchronizing signals.

21. The facsimile unit of claim 20 wherein said modulator means is repeatedly responsive to said mode signaling means so as to repeatedly generate said signals of said first and said second frequencies for said first and said second predetermined durations.

22. The facsimile unit of claim 21 wherein said scanning means comprises a rotatably mounted drum, said detector means being juxtaposed to said rotatably mounted drum, said first and second durations corresponding to predetermined angular positions of said drum.

23. The facsimile unit of claim 22 wherein said drum comprises a clamp means for holding said document in place, said second duration corresponding to juxtaposition of said detector means with said clamp on said drum.

24. A facsimile unit for transmitting signals representing dark-light variations in a document to a remote location comprising:
   detector means for detecting dark-light variations in a document;
   scanning means for moving said detector means relative to the document;
   sync generator means coupled to said scanning means for generating synchronizing signals representing a predetermined relative position between said scanning means and said detector means;
   modulator means coupled to said detector means and said sync generator means for generating modulated transmission signals representing dark-light variations in the document and said predetermined relative position between said scanning means and said detector means; and
   mode signaling means associated with said sync generator means for selecting and controlling the duration of a plurality of said synchronizing signals in response to the selection of a transmission mode during an initial synchronizing period prior to transmission of video representing dark-light variations in a document, said mode signaling means operating by pulse width variation.

25. The facsimile unit of claim 24 wherein said mode signaling means comprises means for generating periodic signals of selected duration prior to transmission of video information representing dark-light variations during a synchronizing period, said periodic signals representing the predetermined relative position of said scanning means relative to said detector means, the time elapsed between said periodic signals being large relative to the duration of said periodic signals.

26. The facsimile unit of claim 25 wherein said scanning means comprises a rotatably mounted drum and said detector means is juxtaposed to said rotatably mounted drum, said periodic signals corresponding to predetermined angular positions of said drum.

27. The facsimile unit of claim 26 wherein said drum comprises clamp means for holding said document in place, said periodic signal being coupled to said modulator means so as to generate a modulated transmission signal resembling a transmission signal representing a light area.

28. A facsimile unit for transmitting signals representing dark-light variations in a document to a remote location:
   detector means for detecting dark-light variations in a document;
   scanning means for moving said detector means relative to the document;
   sync generator means coupled to said scanning means for generating synchronizing signals representing a predetermined relative position between said scanning means and said detector means;
   frequency modulator means coupled to said detector means and said sync generator means for generating frequency modulated transmission signals representing dark-light variations in the document and said predetermined relative positions between said scanning means and said detector means;
   first mode signaling means associated with said frequency modulator means for signaling the scanning rate of said scanning means, said first mode signaling means including means for varying the frequency of a transmission signal representing a light region on a document;
   first drive means for driving said scanning means at a rate directly proportional to and synchronized with an internally generated drive signal;
   second drive means for driving said scanning means at a rate directly proportional to and synchronized with an externally generated drive signal; and
   second mode signaling means for signaling selection of the internally generated drive signal or the externally generated drive signal, said second mode signaling means including means for controlling the duration of the synchronizing signal and the duration of transmission signals representing the light region on a document during the synchronizing signal.

29. A facsimile unit for transmitting signals representing dark-light variations in a document to a remote location comprising:
   detector means for detecting dark-light variations in a document;
   scanning means for moving said detector means relative to the document;
   sync generator means coupled to said scanning means for generating synchronizing signals representing a predetermined relative position between said scanning means and said detector means;
   modulator means coupled to said detector means for generating modulated video transmission signals representing dark-light variations, said modulator means also coupled to said sync generator means for generating a first modulated synchronizing transmission signal generally resembling a modulated video transmission signal corresponding to a dark area and a second modulated synchronizing transmission signal generally resembling a modulated video transmission signal corresponding to a light area; and
   mode signaling means associated with said sync generator means and said modulator means for varying the duration of said second modulated synchronizing transmission signals in response to the selection of a transmission mode during a synchronizing period prior to the transmission of said modulated video transmission signals.

30. A facsimile unit for transmitting signals representing dark-light variations in a document to a remote location, of the type having a detector means for detecting dark-light variations in a document, scanning means comprising a rotatably mounted drum upon which said document is mounted by a clamp, a blanking generator means coupled to said scanning means for generating blanking signals representing a light condition of said document when said detector means is associated with said clamp, modulator means coupled to said detector means and to said blanking generator means for generating modulated transmission signals representing the dark-light variations in the document and wherein said blanking signals comprise a synchronizing signal representing a predetermined relative position between said scanning means and said detector means during an initial synchronizing period, wherein the improvement comprises:
   mode signaling means associated with said blanking generator means for varying the width of said blanking signal during the initial synchronizing period prior to transmission of video representing dark-light variations in said document.

* * * * *